United States Patent
Unno

(10) Patent No.: US 9,170,171 B2
(45) Date of Patent: Oct. 27, 2015

(54) METHOD AND DEVICE OF MEASURING WAVEFRONT ABERRATION, METHOD OF MANUFACTURING OPTICAL SYSTEM, AND RECORDING MEDIUM

(71) Applicant: CANON KABUSHIKI KAISHA, Tokyo (JP)

(72) Inventor: Yasuyuki Unno, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 60 days.

(21) Appl. No.: 14/082,779

(22) Filed: Nov. 18, 2013

(65) Prior Publication Data
US 2014/0139826 A1    May 22, 2014

(30) Foreign Application Priority Data
Nov. 19, 2012 (JP) ................................ 2012-253308

(51) Int. Cl.
*G01B 9/00* (2006.01)
*G01M 11/02* (2006.01)

(52) U.S. Cl.
CPC ................................ *G01M 11/0257* (2013.01)

(58) Field of Classification Search
CPC ..... G01J 9/00; G01J 2003/064; G01J 1/0414; G01J 1/0437; G01J 9/02; G01J 2009/002; G01J 2009/0203; G02B 26/06; G02B 26/0825; G02B 27/0012; G02B 27/0025; G02B 27/0043; G02B 27/0068; G02B 7/023
See application file for complete search history.

(56) References Cited

U.S. PATENT DOCUMENTS

| | | | |
|---|---|---|---|
| 6,791,696 B1* | 9/2004 | Fantone et al. | 356/601 |
| 2003/0151821 A1* | 8/2003 | Favalora et al. | 359/619 |
| 2010/0277694 A1* | 11/2010 | Neal et al. | 351/221 |
| 2011/0134438 A1* | 6/2011 | Kato | 356/517 |
| 2012/0300196 A1* | 11/2012 | Copland | 356/124 |
| 2013/0092816 A1* | 4/2013 | Barrett et al. | 250/201.9 |
| 2013/0216125 A1* | 8/2013 | Shroff et al. | 382/154 |
| 2013/0250099 A1* | 9/2013 | Iijima et al. | 348/135 |
| 2014/0009765 A1* | 1/2014 | Sugimoto | 356/517 |

FOREIGN PATENT DOCUMENTS

EP    1777942 A2 *  4/2007
JP    2005-098933 A   4/2005

* cited by examiner

*Primary Examiner* — Michael P Stafira
(74) *Attorney, Agent, or Firm* — Canon USA Inc. IP Division

(57) ABSTRACT

A wavefront aberration measuring method forms a plurality of spot images by causing light, which is transmitted through a test optical system, to be incident on a lenslet array, and measures positions of the spot images. Optical paths from the positions of the measured spot images toward a light source are calculated, parameters of the test optical system when light rays from the positions of the spot images converge at the light source are specified, and a wavefront aberration of the test optical system corresponding to the parameters of the test optical system is calculated.

8 Claims, 16 Drawing Sheets

METHOD AND DEVICE OF MEASURING WAVEFRONT ABERRATION, METHOD OF MANUFACTURING OPTICAL SYSTEM, AND RECORDING MEDIUM

BACKGROUND OF THE INVENTION

1. Field of the Invention

The present disclosure generally relates to optics and, more particularly, to a wavefront aberration measuring method and a wavefront aberration measuring device that measure wavefront aberrations of optical systems. In particular, the wavefront aberration measuring method and the wavefront aberration measuring device may be used for detection of a manufacturing error of an optical system.

2. Description of the Related Art

The Shack-Hartmann method is known as a method of measuring a wavefront aberration of an optical system. The Shack-Hartmann method forms a plurality of spot images by causing light, which is transmitted through a test optical system, to be incident on a lenslet array, reconfigures a transmitted wavefront of the test optical system based on the positions of the plurality of spot images, and hence measures a wavefront aberration.

Referring to Japanese Patent Laid-Open No. 2005-98933, the focal length of a collimator lens is changed in accordance with the magnitude relationship between the F-number of the test optical system and the F-number of the collimator lens, to increase the spatial resolution of aberration measurement.

When the wavefront aberration of the optical system is measured by the Shack-Hartmann method, the measurement result of the wavefront aberration may be changed depending on an arrangement error of the optical system with respect to a measuring device, and hence the wavefront aberration of the optical system may not be correctly measured.

SUMMARY OF THE INVENTION

The present disclosure provides a wavefront aberration measuring method and a wavefront aberration measuring device that can perform measurement for wavefront aberrations by relatively few calculations, the measurement in which the influence of an arrangement error of an optical system with respect to a measuring device is decreased. Also, the disclosure provides a method of manufacturing an optical system using the wavefront aberration measuring device, and a recording medium storing a program using the wavefront aberration measuring device.

According to an aspect of the disclosure, a wavefront aberration measuring method includes a measuring step of forming a plurality of spot images by causing light, which is emitted from a light source and is transmitted through a test optical system, to be incident on a lenslet array, and measuring positions of the plurality of spot images formed by the lenslet array; and a calculating step of calculating optical paths from the positions of the plurality of spot images toward the light source, specifying parameters of the test optical system when light rays from the positions of the plurality of spot images converge at the light source, and calculating a wavefront aberration of the test optical system corresponding to the parameters of the test optical system.

According to another aspect of the disclosure, a method of manufacturing an optical system includes a step of evaluating an optical characteristic of an optical system by using the above-described wavefront aberration measuring method.

According to still another aspect of the disclosure, a wavefront aberration measuring device includes a light source configured to emit light which is incident on a test optical system; a lenslet array on which the light transmitted through the test optical system is incident; a light receiving element configured to receive the light transmitted through the lenslet array; and a calculating unit configured to calculate optical paths from positions of a plurality of spot images formed on the light receiving element by the lenslet array toward the light source, specify parameters of the test optical system when light rays from the positions of the plurality of spot images converge at the light source, and calculate a wavefront aberration of the test optical system corresponding to the parameters of the test optical system.

According to yet another aspect of the disclosure, a non-transitory recording medium storing a program for causing a wavefront aberration measuring device to execute a method, the method including a measuring step of forming a plurality of spot images by causing light, which is emitted from a light source and is transmitted through a test optical system, to be incident on a lenslet array, and measuring positions of the plurality of spot images formed by the lenslet array; and a calculating step of calculating optical paths from the positions of the plurality of spot images toward the light source, specifying parameters of the test optical system when light rays from the positions of the plurality of spot images converge at the light source, and calculating a wavefront aberration of the test optical system corresponding to the parameters of the test optical system.

Further features of the present disclosure will become apparent from the following description of exemplary embodiments with reference to the attached drawings.

DESCRIPTION OF THE EMBODIMENTS

Various exemplary embodiments of the disclosure will be described below with reference to the drawings.

First Embodiment

Figure 1:
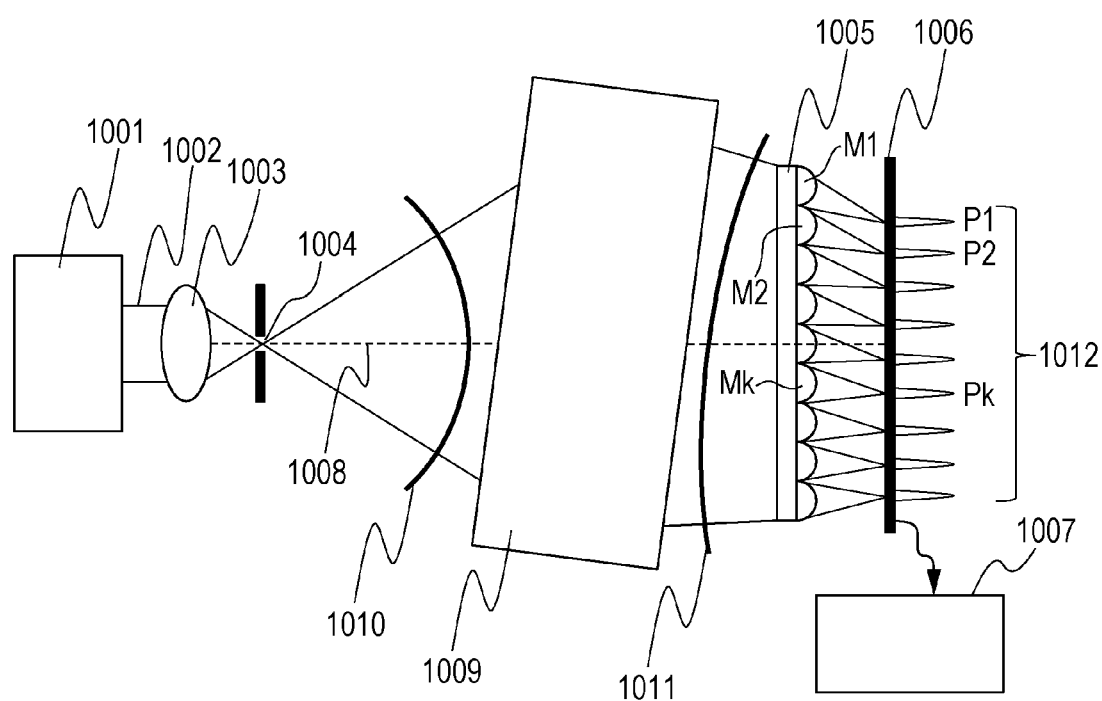
FIG. 1 is an explanatory illustration of a wavefront aberration measuring device according to an embodiment of the disclosure.

FIG. 1 is an explanatory illustration of a Shack-Hartmann wavefront aberration measuring device used for performing a wavefront aberration measuring method according to a first embodiment of the disclosure. In FIG. 1, light rays 1002 emitted from a laser light source 1001 are collected by a collective lens (condenser lens) 1003. The laser light source is suitable as the light source; however, the light source may not be the laser light source. A center portion of the collected light rays is taken by a pinhole 1004, and a point light source is formed at the position of the pinhole 1004.

An incident wavefront 1010, which is a wavefront of light rays emitted from the pinhole 1004 and being incident on a test optical system 1009, is a wavefront of spherical waves. A transmitted wavefront 1011, which is a wavefront of light rays transmitted through the test optical system 1009, is a wavefront with a shape influenced by an aberration of the test optical system 1009.

The light rays transmitted through the test optical system 1009 are incident on a lenslet array 1005 formed of a plurality of lenslets (M1, M2, . . . , Mk, . . . ). The transmitted wavefront 1011 transmitted through the test optical system 1009 is divided by the plurality of lenslets of the lenslet array 1005, and, for example, a transmitted wavefront divided by a lenslet Mk, which is the k-th lenslet when counted from above in FIG. 1, is transformed into a spot image Pk. The light rays transmitted through the lenslet array 1005 are received by a light receiving element 1006. A plurality of spot images 1012 (P1, P2, . . . , Pk, . . . ) are formed on the light receiving element 1006 by the lenslet array 1005.

If the aberration of the test optical system 1009 is small and if the deformation of the transmitted wavefront 1011 is small, the spot images 1012 are formed in accordance with a periodic array of the lenslet array 1005. Hence, the spot image Pk generated by the lenslet Mk can be easily specified. At this time, the correspondences between the plurality of lenslets forming the lenslet array 1005 and the plurality of spot images 1012 formed on the light receiving element 1006 are clear. However, if the aberration of the test optical system 1009 is large and the deformation of the transmitted wavefront 1011 is large, the position of the spot image is largely moved, and the spot image Pk generated by the lenslet Mk may not be easily specified.

A calculation unit 1007 acquires position information of the spot images 1012 based on the output from the light receiving element 1006. Then, based on the position information, the transmitted wavefront 1011 of the test optical system 1009 is reproduced.

The positional relationship among the pinhole 1004, the lenslet array 1005, and the light receiving element 1006 is determined with reference to the optical axis 1008. The pinhole 1004, the lenslet array 1005, and the light receiving element 1006 are arranged substantially perpendicularly to the optical axis 1008. The center of the opening portion of the pinhole 1004 is present on the optical axis 1008.

Since the test optical system 1009 such as a lens for a camera cannot be manufactured by directly reproducing design values, the test optical system 1009 has an optical characteristic different from the optical characteristic of an ideal test optical system (a reference test optical system) having the same optical characteristic as the optical characteristic provided by the design values. Now, a shift of the shape of the test optical system 1009 from the shape of the reference test optical system is defined as a shape error. Also, when the test optical system 1009 is installed on a measuring device, decentration and inclination may occur with respect to a predetermined reference position at which the reference test optical system is installed. The decentration and inclination may influence the shape of the wavefront transmitted through the test optical system 1009. The influence is defined as an arrangement error. The arrangement error and the shape error are calculated by ray tracing (described later). That is, a wavefront aberration of the test optical system 1009 is calculated with regard to the optical characteristic of the reference test optical system and a change in wavefront aberration caused by the shape error and the arrangement error.

Figure 2A:
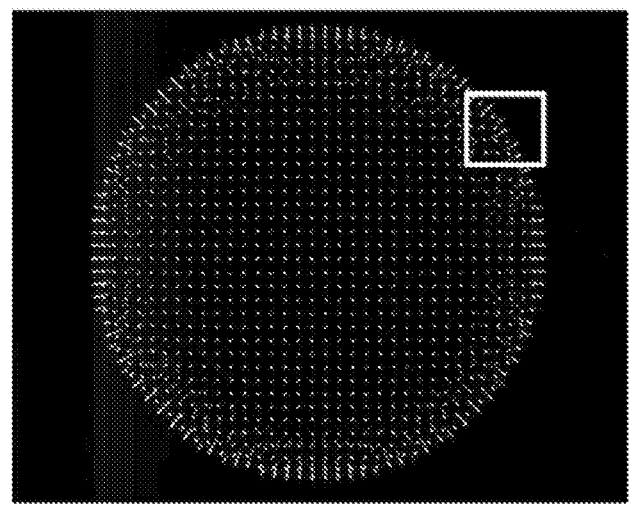
FIGS. 2A and 2B are explanatory illustrations of a plurality of spot images formed on a light receiving element.
Figure 2B:
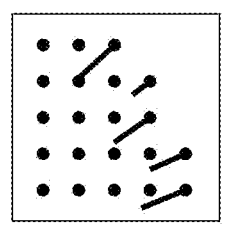

FIGS. 2A and 2B illustrate a distribution of the spot images 1012 in a plane perpendicular to the optical axis 1008, the spot images 1012 which are formed on the light receiving element 1006. FIG. 2A illustrates the entire distribution of the spot images. FIG. 2B schematically illustrates part of FIG. 2A in an enlarged manner. In FIGS. 2A and 2B, images elongated in a linear shape appear in a peripheral portion of spot images distributed in a circular shape. In this case, the lenslets and the spot images are on a clear one-to-one correspondence in a center portion. That is, the spot image Pk collected by the lenslet Mk can be easily discriminated. However, in the peripheral portion separated from the optical axis 1008, the distance between the sport images is small, and the correspondences between the lenslets and the spot images are not clear. The spot image elongated in the linear shape in FIG. 2B is generated because light rays passing through adjacent lenslets interfere with each other.

Figure 3:
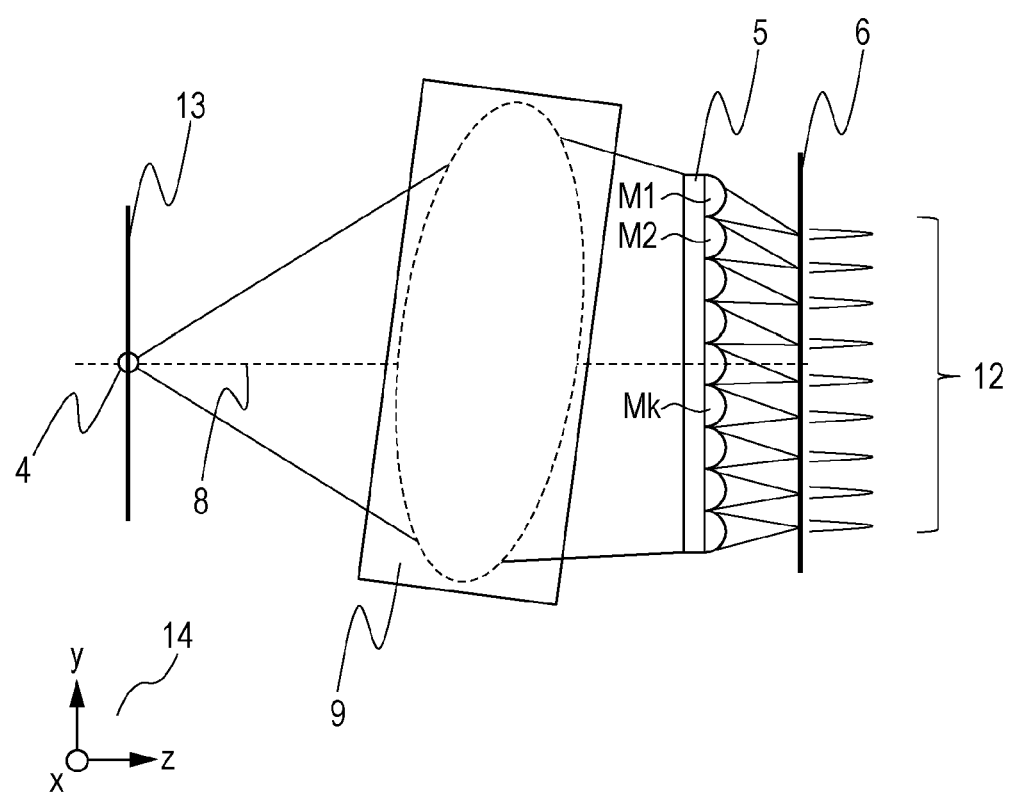
FIG. 3 is an explanatory illustration of an optical model used for ray tracing.

FIG. 3 is an optical model for imaginarily reproducing a wavefront aberration measuring device shown in FIG. 1. A point light source 4 is set at the position of the pinhole 1004, a test optical system model 9 is reproduced as the test optical system 1009, and a lenslet array model 5 is reproduced as the lenslet array 1005. An image plane 6 is set at the position of the light receiving element 1006. Spot images 12 are formed on the image plane 6. An object plane 13 is defined as a plane, which includes the point light source 4 and is perpendicular to the optical axis 8. Reference sign 14 denotes a coordinate system having the z-axis along the direction of the optical axis 8, and the image plane 6 and the object plane 13 are located together in the x-y plane.

The lenslet array model 5 is reproduced as the lenslet array 1005 having a known optical characteristic. Individual lenslet models are expressed (as M1, M2, . . . , Mk, . . . ) like the wavefront aberration measuring device in FIG. 1. The test optical system model 9 is a model in which a parameter that expresses the influence of the shape error and the arrangement error is introduced to the optical characteristic of the reference test optical system.

In this embodiment, an imaginary light source is set on the image plane 6 of the optical model, and light rays are traced toward an image point imaginarily set on the object plane 13. Since ray tracing is performed from the image plane toward the object plane while the light source is imaginarily set on the image plane 6 and the image point is imaginarily set on the object plane 13 in the original wavefront aberration measuring device, this method of ray tracing is described as backward ray tracing.

Figure 4:
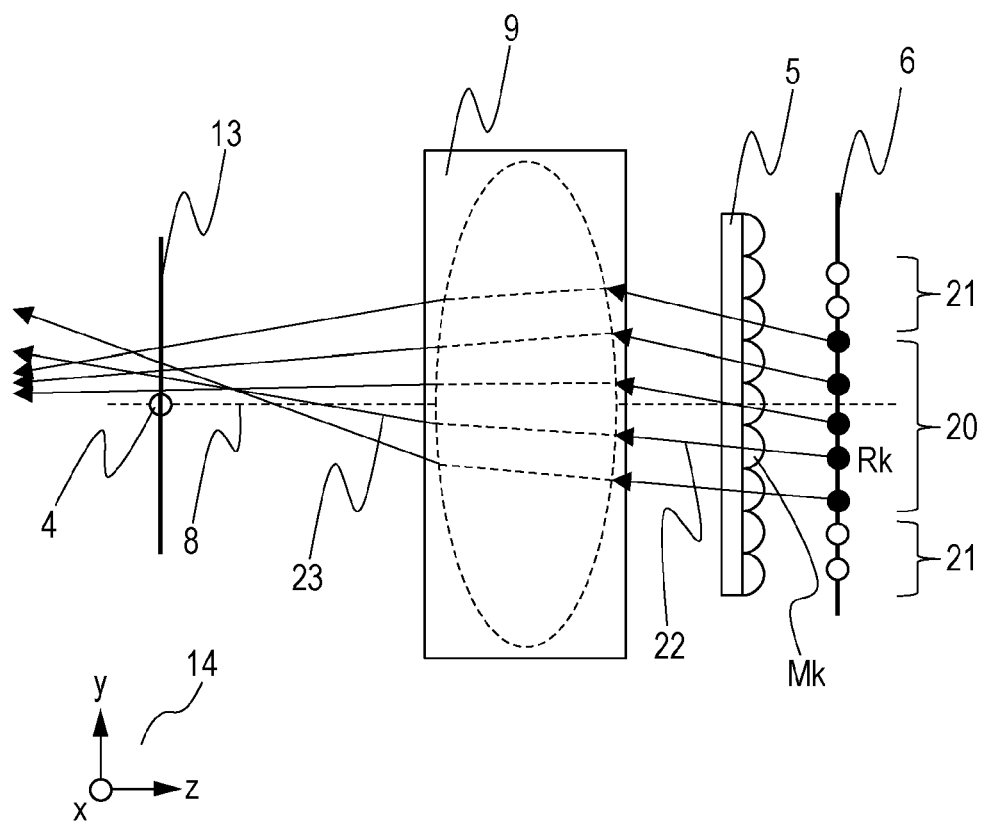
FIG. 4 is an explanatory illustration of backward ray tracing by a wavefront aberration measuring method according to a first embodiment of the disclosure.

A specific process of the backward ray tracing is described below. FIG. 4 is an illustration explaining an overview of the backward ray tracing of the disclosure. First, an imaginary light source is set at a position on the image plane 6 of the optical model, corresponding to the actually measured position of the spot image Pk in FIG. 1.

It is assumed that the correspondence between a lenslet and a spot image is clear for a spot image which is a subject of the backward ray tracing. The correspondence between a lenslet and a spot image may not be occasionally clearly determined. That is, the lenslet, which transmits the light that forms the spot image Pk, may not be easily determined. In particular, in a region separated from the optical axis 8, the correspondence between a lenslet and a spot image is complicated. In FIG. 4, a region 20 is a region in which the above-described correspondence is clear, and a region 21 is a region in which the above-described correspondence is not clear.

According to this embodiment, in the optical model, a light ray 22, which starts from an imaginary light source Rk, passes through the center of the exit pupil of the lenslet Mk, and is incident on the test optical system model 9, is set. Then, ray tracing is performed on a light ray 23, which has been transmitted through the test optical system model 9. The ray tracing is performed on all imaginary light sources in the region 20. In this embodiment, ray tracing based on geometrical optics is performed; however, tracing based on wave optics may be performed. In the following description, the ray tracing based on geometrical optics is basically performed to decrease the time required for the ray tracing.

In FIG. 4, if the shape error and the arrangement error are correctly set as the test optical system model 9, a light ray emitted from the point light source 4 and passing through the lenslet Mk intersects with the image plane 6 at the position of the imaginary light source Rk. In contrast, a light ray traced from the imaginary light source Rk as the starting point toward the lenslet Mk intersects with the object plane 13 at the position of the point light source 4.

If the light ray does not pass through the position of the point light source 4 as the result of the ray tracing, the reason is that the shape error and the arrangement error of the test optical system model 9 are not correctly set.

In this embodiment, the shape error and the arrangement error are set as parameters, and the values of the parameters are changed so that all light rays shown in FIG. 4 converge at the point light source 4. The process of changing the values of the parameters is called optimization for optical paths. If the optimization is attained, the light rays are collected at the point light source 4. In the ray tracing of the disclosure, the shape error and the arrangement error may be set as different parameters. Hence, the arrangement error of the test optical system 1009 can be eliminated, and the wavefront aberration of the test optical system 1009 can be accurately measured.

Figure 5:
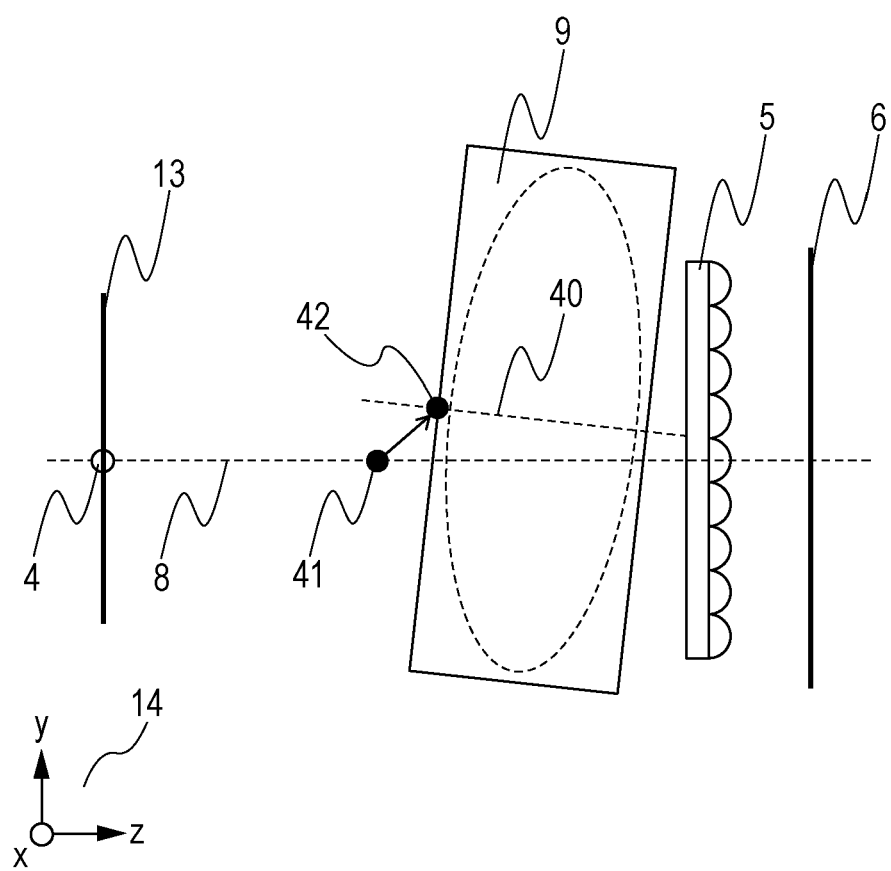
FIG. 5 is an explanatory illustration of an arrangement error of a test optical system.

Next, a method of setting a parameter expressing an arrangement error is described with reference to FIG. 5. In a state in which a shape error is not present, the test optical system model 9 has rotational symmetry with respect to a symmetry axis 40. A point 41 is defined as a point separated from the point light source 4 by a predetermined distance on the optical axis 8, and a point 42 is defined on the symmetry axis 40. On the precondition that the point 41 is aligned with the point 42 when the arrangement error is not present, the arrangement error can be expressed by 5 parameters as follows. To be more specific, it is assumed that $\Delta x$, $\Delta y$, and $\Delta z$ are respectively displacement amounts of the point 42 in the x-axis, y-axis, and z-axis directions with reference to the point 41. Also, it is assumed that $\Delta \phi x$ is a rotation amount around the x-axis, and $\Delta \phi y$ is a rotation amount around the y-axis from the point 41 toward the point 42.

Figure 6:
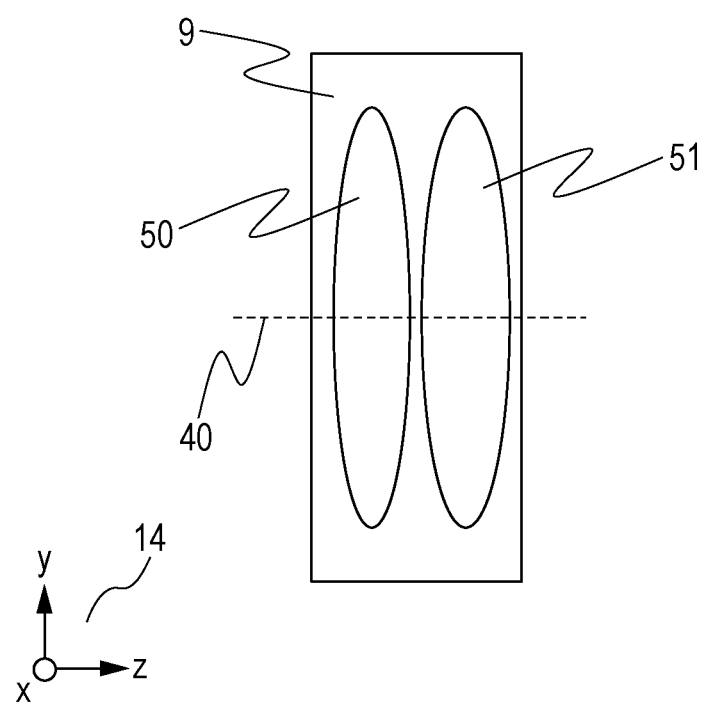
FIG. 6 is an explanatory illustration of a test optical system without a shape error.

Next, a method of setting a parameter expressing a shape error of the test optical system 1009 is described. FIG. 6 is a cross-sectional view on the yz plane of the test optical system model 9 that reflects the configuration of the test optical system 1009. The test optical system 1009 is typically formed of a plurality of lens elements. Each element has, for example, a processing error, a decentration error of decentration with respect to the symmetry axis 40, and an inclination error of inclination with respect to the symmetry axis 40. With these errors, the optical characteristic of the test optical system 1009 is shifted from the optical characteristic of the reference test optical system.

FIG. 6 is a schematic illustration when the reference test optical system is formed of two lens elements 50 and 51. FIG. 6 illustrates a state in which the lens elements 50 and 51 are separated from each other by a predetermined distance on the central symmetry axis 40.

Figure 7A:
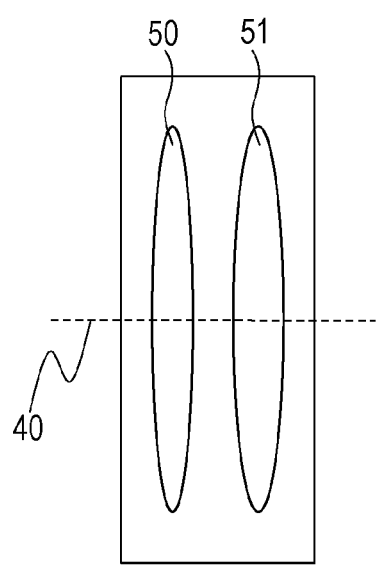
FIGS. 7A to 7C are explanatory illustrations of shape errors of test optical systems.
Figure 7B:
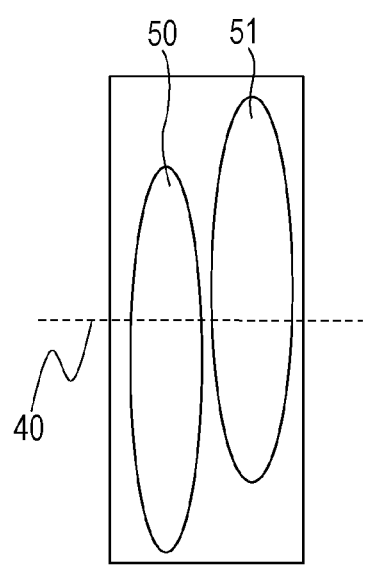
Figure 7C:
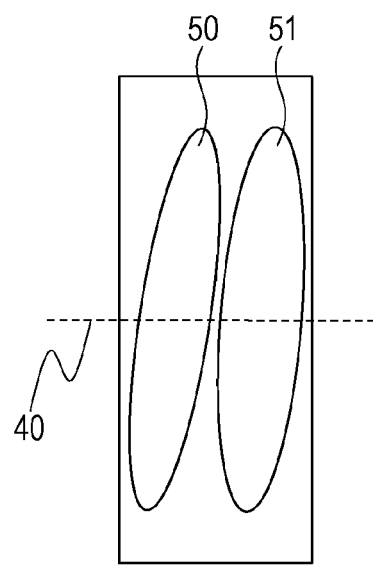

FIGS. 7A to 7C illustrate typical models that express shape errors. FIG. 7A illustrates a state in which the optical characteristics of the lens elements 50 and 51 are different from the design optical characteristic, and have processing errors. FIG. 7B illustrates a state in which the lens elements 50 and 51 have decentration errors. FIG. 7C illustrates a state in which the lens elements 50 and 51 have inclination errors. In this way, the shape error of the test optical system 1009 may be expressed by the processing error, the decentration error, and the inclination error.

Figure 8:
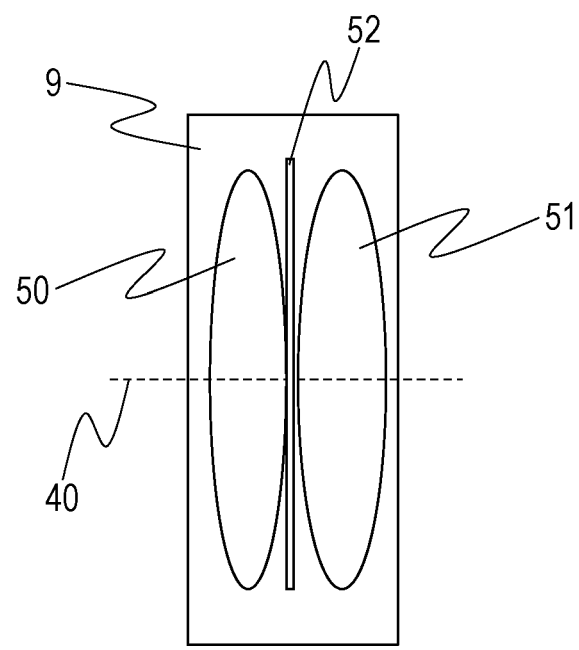
FIG. 8 is an explanatory illustration of a dummy element that provides a shape error of a test optical system.

In the disclosure, the shape errors shown in FIGS. 7A to 7C are collectively expressed by using a dummy element. In FIG. 8, it is assumed that the lens elements 50 and 51 are processed and manufactured according to the design and do not have a decentration error or an inclination error. Reference sign 52 denotes a dummy element with an assumption that the thickness is zero. The dummy element provides an imaginary change in wavefront to a light ray transmitted through the test optical system model 9. The entire influence of the shape error is expressed as a change in wavefront added by the dummy element 52.

A change in shape of a wavefront is expressed by using the Fringe Zernike polynomial. To be more specific, a change in shape of a wavefront is expressed by expansions of terms including first to sixteenth terms as indicated in Table 1. In this case, if coefficients (Zernike coefficients) corresponding to the respective terms are Zj (j: 1 to 16), the influence of shape error in the test optical system model 9 can be expressed by 16 parameters. If a shape error is not present, the value of the Zernike coefficient of each term becomes zero. The shape error can be accurately estimated through a simulation using the dummy element 52 except for a case in which the shape error is extremely large. In this case, the Fringe Zernike polynomial expressing the shape error is not limited to the polynomial including the sixteen terms, and may be expressed by expansions with lower-order terms or higher-order terms.

A method of estimating a shape error and an arrangement error of the test optical system 1009 by using the test optical system model 9 is described below. The influence of an arrangement error is expressed by 5 parameters ($\Delta x$, $\Delta y$, $\Delta z$, $\Delta \phi x$, $\Delta \phi y$), and the influence of a shape error is expressed by 16 parameters (Zernike coefficients) Zj.

Calculations for providing the optimization for optical paths, known optical design software may be applied. For example, in FIG. 4, the position at which the light ray 23 intersects with the object plane 13 is expressed as a coordinate (xk, yk, 0), and a cost function is defined by Expression (1) as follows:

$$\sum_k [(x_k)^2 + (y_k)^2], \quad (1)$$

where a subscript k corresponds to the imaginary light source Rk on the image plane 6, and the results of light rays starting from all imaginary light sources in the region 20 are added. The added numerical value is minimized to provide the optimization. An example of such a calculation method may be a damped least square (DLS) method.

Figure 9:
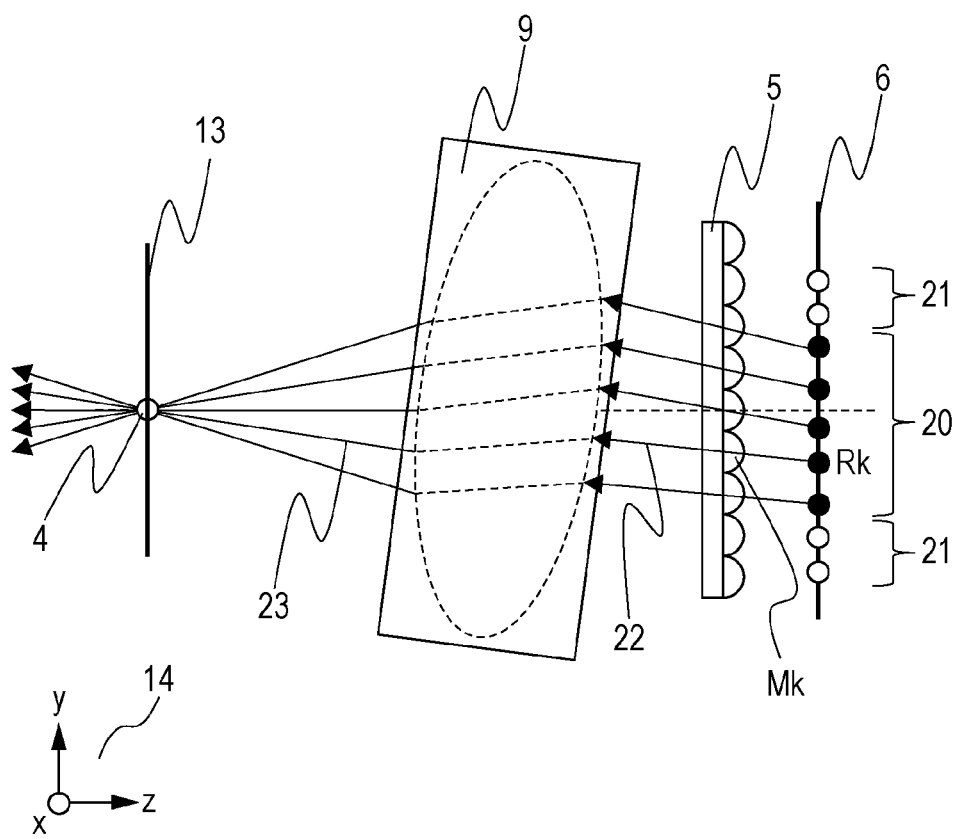
FIG. 9 is an explanatory illustration of backward ray tracing by a wavefront aberration measuring method according to the first embodiment of the disclosure.

FIG. 9 illustrates the loci of the light rays after the optimization is attained. At this time, the Zernike coefficients indicative of the shape error of the test optical system 1009, and the values of the parameters ($\Delta x$, $\Delta y$, $\Delta z$, $\Delta \phi x$, $\Delta \phi y$) indicative of the arrangement error of the test optical system 1009 are values when the optimization is attained. Hence, a shape error component can be obtained. By using this, the transmitted wavefront of the test optical system 1009 regarding the influence of the shape error can be reproduced.

Figure 10:
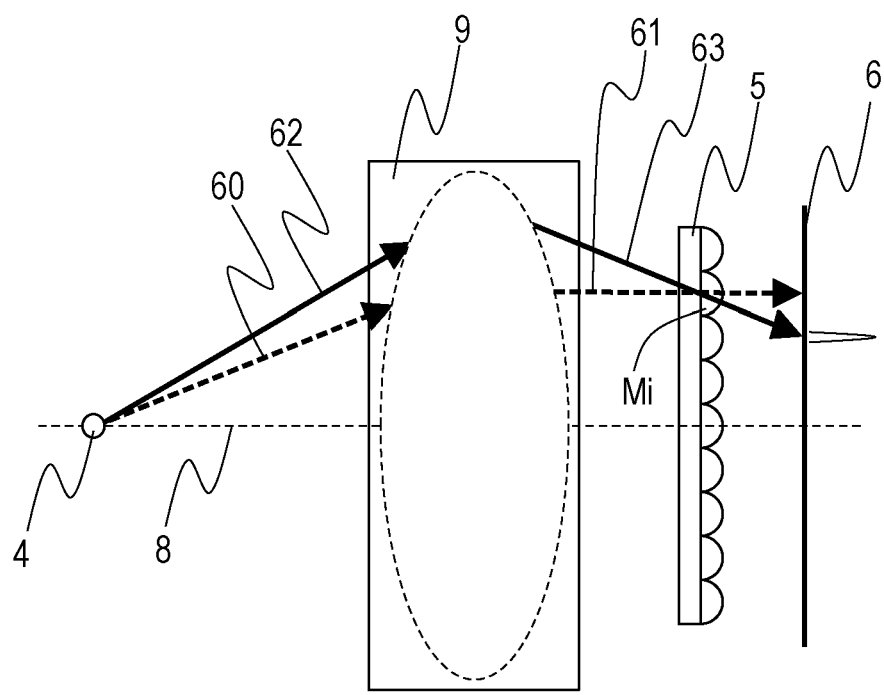
FIG. 10 is an explanatory illustration of forward ray tracing.
Figure 11:
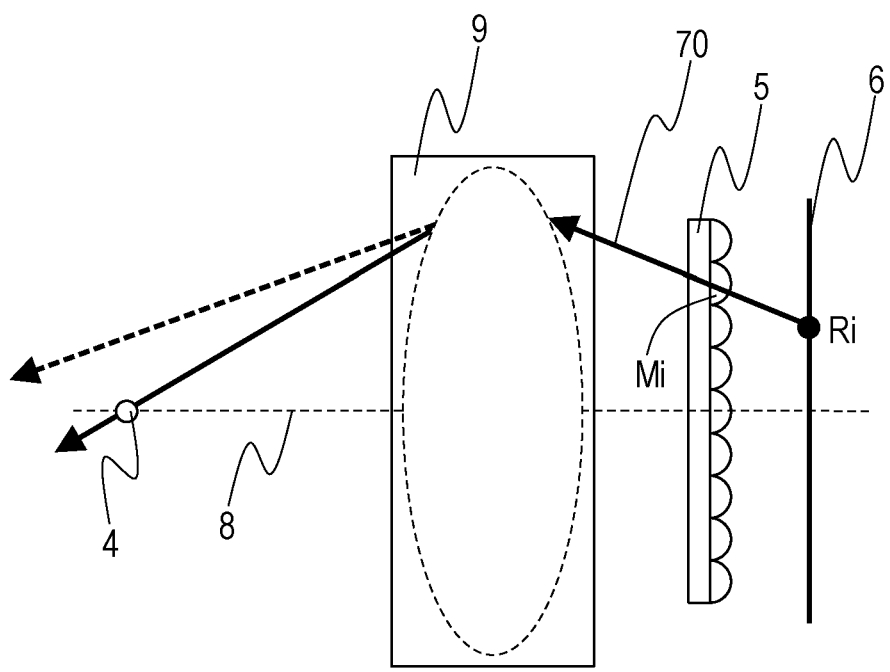
FIG. 11 is an explanatory illustration of backward ray tracing.

An advantage of backward ray tracing according to the disclosure is described with reference to FIGS. 10 and 11. FIG. 10 illustrates a method of ray tracing from the point light source 4 toward the image plane 6 of the optical model (forward ray tracing). FIG. 11 illustrates a method of backward ray tracing from an imaginary light source Ri toward the point light source 4 when the imaginary light source Ri is set on the image plane 6.

In the forward ray tracing, a plurality of light rays which become subjects of tracing may be generated. In particular, referring to FIG. 10, light rays traced from the point light source 4 toward the center of a lenslet Mi may be a dotted line 60 and a solid line 62. The test optical system model 9 is present between the point light source 4 and the lenslet array model 5. Hence, the light rays as the subjects of tracing may not be uniquely determined by the influence of refraction etc. of the light rays. Since the calculation to be performed in the process of the optimization for optical paths becomes complicated, the time required for measuring the wavefront aberration may be increased. Also, the cost function may become a local solution which is the local minimum value. The measurement accuracy may become insufficient. Thus, the forward ray tracing is not suitable.

In contrast, referring to FIG. 11, the backward ray tracing is performed from the imaginary light source Ri on the image plane 6 as the starting point. The light ray to be incident on the test optical system model 9 may be determined as a light ray 70 in the process of the optimization calculation. Accordingly, the time required for the optimization is markedly decreased. Also, a possibility that the cost function becomes the local solution is markedly decreased.

Figure 12:
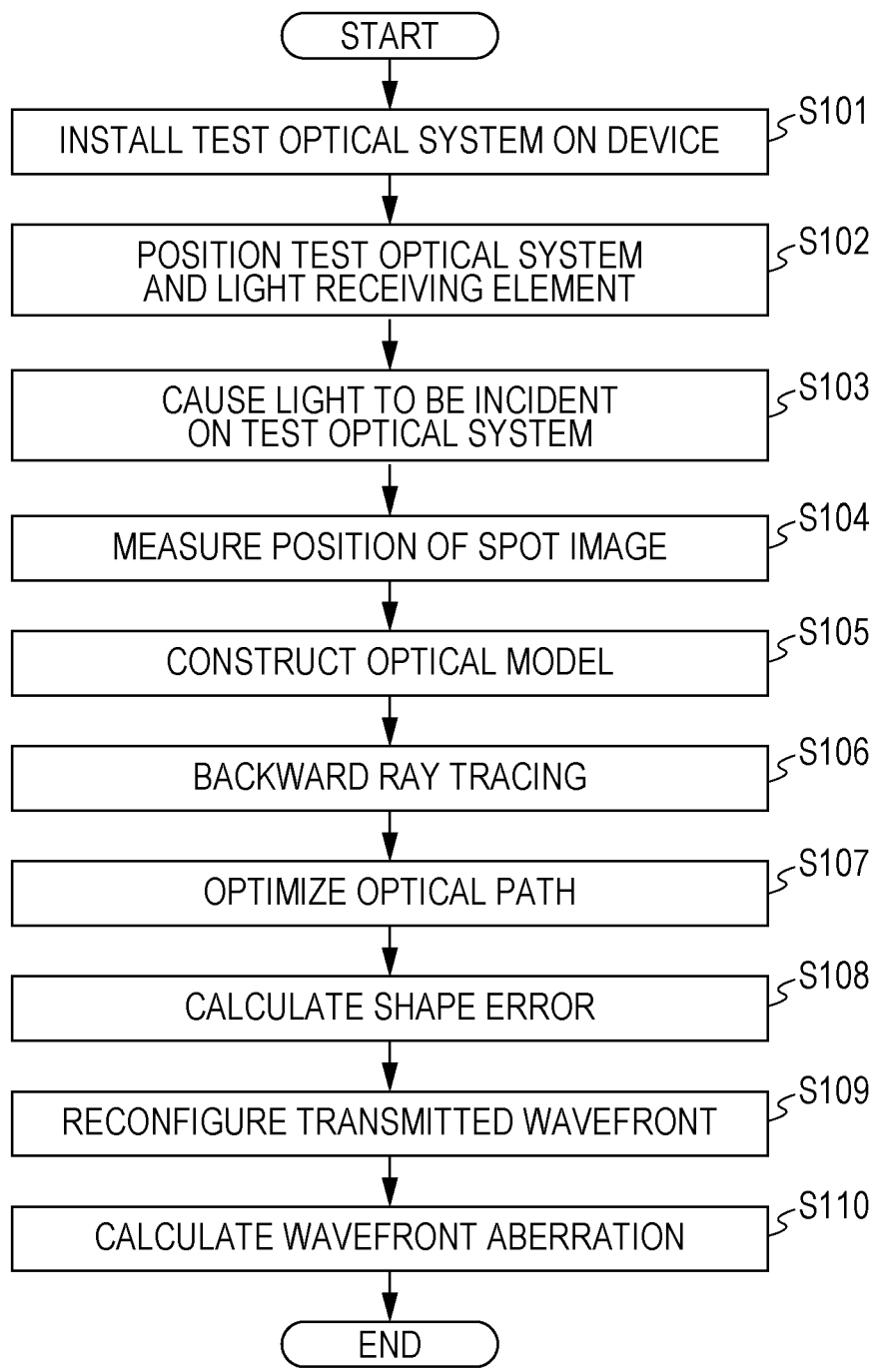
FIG. 12 is a flowchart of the wavefront aberration measuring method according to the first embodiment of the disclosure.

FIG. 12 is a flowchart showing an example of an operation of a wavefront aberration measuring method according to this embodiment. A step is abbreviation to "S." The entire flowchart can be roughly divided into two of a measuring step and a calculating step.

First, the test optical system is installed on the device (S101). Then, the test optical system 1009, the light receiving element 1006, etc., are positioned if required with reference to the optical axis (S102), and light is caused to be incident on the test optical system 1009 (S103). Then, the position of a spot image generated on the light receiving element 1006 is measured, and position information of the spot image is stored in the calculation unit 1007 (S104). The above-described process is the measuring step according to this embodiment.

Next, the calculating step is described. First, the optical model including components of the test optical system model 9 and the lenslet array model 5 is constructed (S105). Then, a shape error and an arrangement error of the test optical system are set at parameters, backward ray tracing is performed the position of the spot image as the starting point (S106), the values of the parameters are changed, and optical paths are optimized (S107). Then, a shape error when the optimization for optical paths is attained (S108), and a wavefront transmitted through the test optical system is reconfigured (S109). Further, the wavefront transmitted through the reference test optical system is compared with the wavefront reconfigured in S109, and hence a wavefront aberration of the test optical system is calculated (S110).

The calculation unit 1007 stores a computer program for causing a computer processing unit (CPU) (not shown) to provide the measuring step and the calculating step.

Second Embodiment

According to the first embodiment, in FIG. 9, the backward ray tracing is performed only for the spot image in the region 20 in which the correspondence between a lenslet and a spot image is clearly determined. That is, position information of the spot image in the region 21 in which the correspondence is not clear is not used when the wavefront aberration is measured. Owing to this, a second embodiment provides a method of measuring a wavefront aberration by using a larger number of spot images by clarifying the correspondence between a lenslet and a spot image in the region 21 in which the correspondence is not clear.

Figure 13:
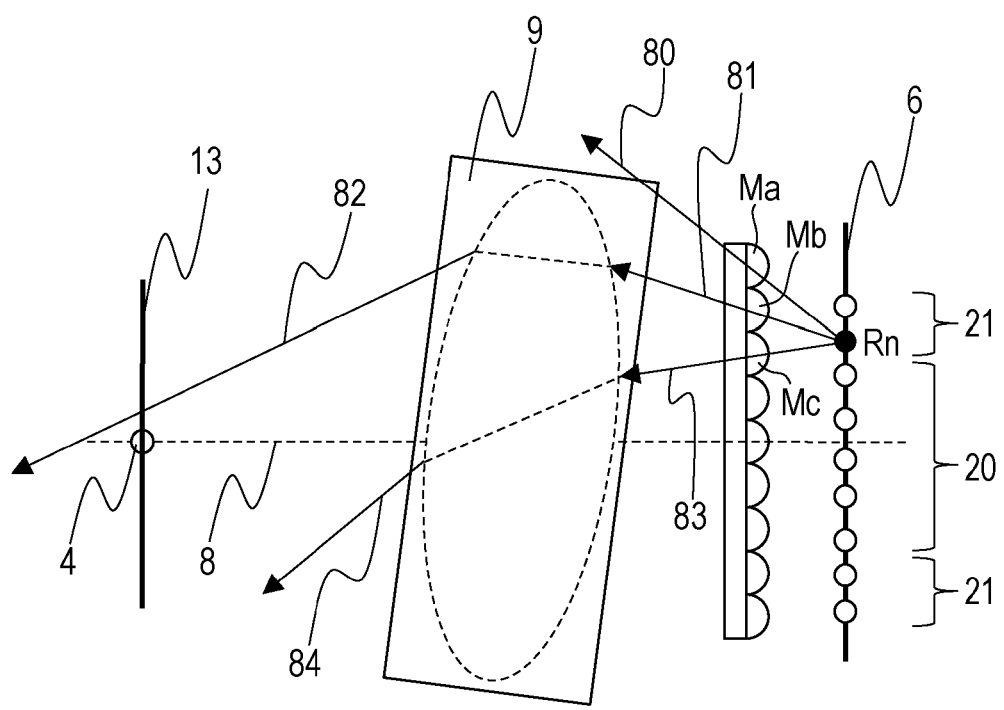
FIG. 13 is an explanatory illustration of a wavefront aberration measuring method according to a second embodiment of the disclosure.

In FIG. 13, the parameters indicative of the shape error and the arrangement error of the test optical system model 9 have the values when the optimization for optical paths based on the spot image in the region 20 in FIG. 9 is completed. In this case, it is assumed that Rn is an imaginary light source present in the region 21 on the image plane 6, at a position adjacent to the region 20. The lenslet, by which light that forms a spot image corresponding to the position of the imaginary light source Rn is collected, is not clear. Hence, light rays 80, 81, and 82 are set so as to respectively pass through the centers of the exit pupils of a plurality of lenslets (Ma, Mb, Mc) present at positions close to the imaginary light source Rn. Then, backward ray tracing is performed on the light rays 80, 81, and 82 from the imaginary light source Rn as the starting point.

The parameters indicative of the shape error and the arrangement error of the test optical system model 9 have the values when the optimization for optical paths is completed as shown in FIG. 9. A light ray passing through a specific lenslet corresponding to the imaginary light source Rn is transmitted through the test optical system model 9, and then intersects with the object plane 13 at a position close to the point light source 4. In contrast, a light ray passing through a lenslet other than the specific lenslet is not transmitted through the test optical system model 9, like the light ray 80 and a light ray 83, or is transmitted through the test optical system model 9 and then is largely shifted from the point light source 4, like a light ray 84. By performing the backward ray tracing as described above, the lenslet corresponding to the imaginary light source Rn can be correctly determined, and the correspondence between the lenslet and the spot image becomes clear.

The clarification of the correspondence between the spot image in the region 21 and the lenslet, and the optimization for optical paths are performed for each of a plurality of imaginary light sources present in the region 21. Consequently, the parameters indicative of the shape error and the arrangement error of the test optical system model 9 can be more accurately obtained. Hence, measurement accuracy for a wavefront aberration can be increased.

Figure 14:
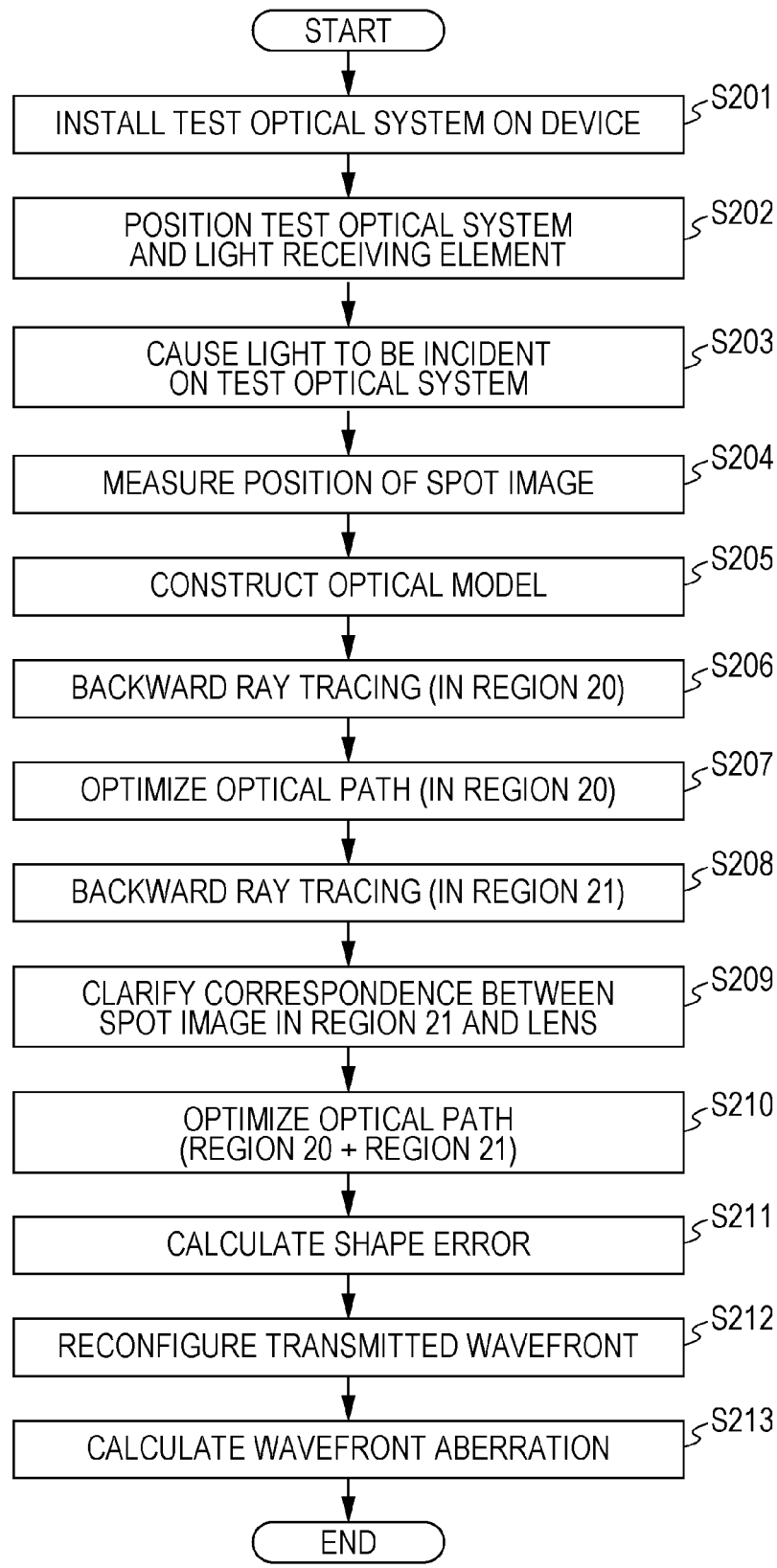
FIG. 14 is a flowchart of the wavefront aberration measuring method according to the second embodiment of the disclosure.

FIG. 14 is a flowchart showing an example of a wavefront aberration measuring method according to this embodiment. The entire flowchart can be roughly divided into two of a measuring step and a calculating step like the first embodiment.

First, the test optical system is installed on the device (S201). Then, the test optical system 1009, the light receiving element 1006, etc., are positioned if required with reference to the optical axis (S202), and light is caused to be incident on the test optical system 1009 (S203). Then, the position of a spot image formed on the light receiving element 1006 is measured, and position information of the spot image is stored in the calculation unit 1007 (S204). The above-described process is the measuring step according to this embodiment, and is similar to the measuring step of the first embodiment.

Next, the calculating step is described. First, the optical model including components of the test optical system model 9 and the lenslet array model 5 is constructed (S205). Then, a shape error and an arrangement error of the test optical system are set at parameters, backward ray tracing is performed from the position of the spot image in the region 20, in which the correspondence between the lenslet and the spot image is clear, as the starting point (S206), the values of the parameters are changed, and optical paths are optimized (S207). Then, backward ray tracing is performed from the position of the spot image in the region 21, in which the correspondence between the lenslet and the spot image is not clear, as the starting point, with reference to the parameters when the optimization is attained in step S207 (S208). In the process of performing the backward ray tracing, the correspondence between the spot image in the region 21 and the lenslet is clarified (S209). In this way, the correspondences between all spot images on the light receiving element 1006 and all lenslets are clarified, the backward ray tracing is performed from all spot images on the light receiving element 1006 as the starting points, and hence the optical paths are optimized (S210). Then, the shape errors are calculated by using the parameters when the optimization is attained in S210 (S211). Further, the wavefront transmitted through the test optical system is reconfigured (S212), the wavefront transmitted through the reference test optical system and the wavefront reconfigured in S212 are compared, and hence a wavefront aberration of the test optical system is calculated (S213).

Third Embodiment

Figure 15:
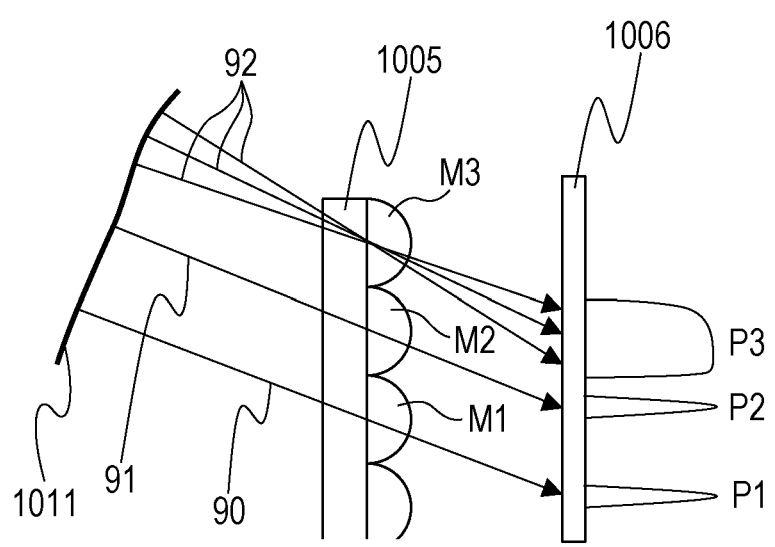
FIG. 15 is an explanatory illustration of a wavefront aberration measuring method according to a third embodiment of the disclosure.

Described next is a method of measuring a wavefront aberration by performing backward ray tracing from a deformed spot image as the starting point if the spot image is deformed. FIG. 15 illustrates an overview of this method. First, a transmitted wavefront 1011 which becomes a subject of measurement can be typically explained by using light rays. In FIG. 15, a light ray near a light ray 90 of a wavefront is collected by a lenslet M1, and the wavefront is transformed into a spot image P1. Also, a light ray near a light ray 91 of a wavefront is collected by a lenslet M2, and the wavefront is transformed into a spot image P2. However, light rays of a wavefront incident on a lenslet M3 cannot be expressed by a single light ray. This is because the distortion of the wavefront is large, and a plurality of light rays with different inclinations are incident on the center of the lenslet M3. In FIG. 15, light rays of the wavefront incident on the lenslet M3 are expressed by using three light rays 92. Consequently, the light rays 92 form a spot image P3 with expansion on the light receiving element 1006. Accordingly, the spot image having linear expansion as shown in FIG. 2B is formed.

In this case, as shown in FIG. 10, even if ray tracing is performed from the point light source 4 toward the image plane 6, the optimization for optical paths cannot be attained. In the state in which the spot image is expanded like the spot image P3, when the ray tracing is performed from the point light source 4, image points on the image plane 6 are not determined at a single point.

Figure 16:
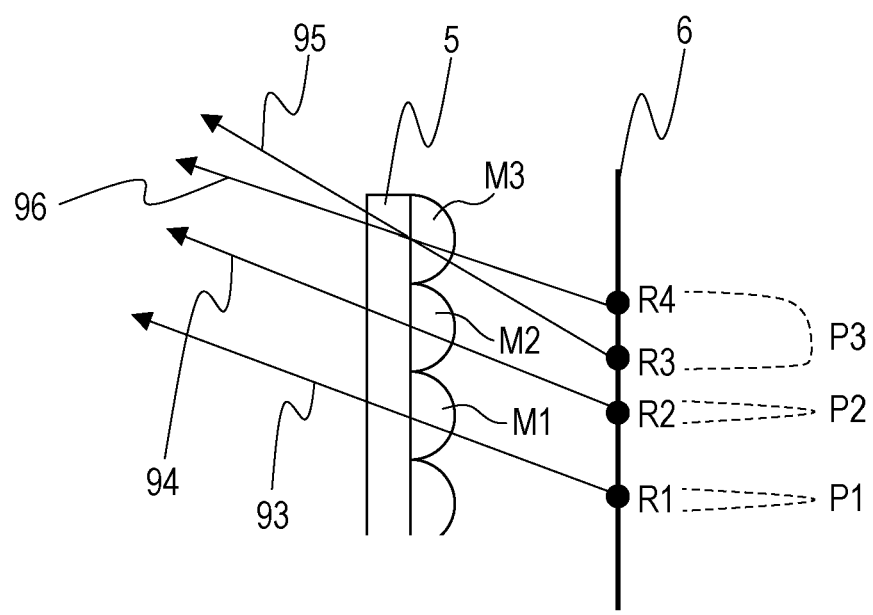
FIG. 16 is an explanatory illustration of backward ray tracing by the wavefront aberration measuring method according to the third embodiment of the disclosure.

In this embodiment, a method of applying backward ray tracing is described with reference to FIG. 16. Imaginary light sources R1 and R2 are defined for the spot images P1 and P2 like the first embodiment, and light rays 93 and 94 are traced toward the centers of the exit pupils of respectively corresponding lenslets M1 and M2. The spot P3 with expansion is replaced with at least two imaginary light sources (R3, R4) in the distribution.

In this case, if the correspondence between a spot image and a lenslet is not clear, the correspondence may be clarified by using the method according to the second embodiment. If the correspondence can be clarified, when the calculation using the cost function according to the first embodiment is performed, light rays 95 and 96 in FIG. 15 may be included. Accordingly, the wavefront aberration of the test optical system can be measured with higher accuracy.

Other Embodiments

The wavefront aberration measuring method according to any of the above-described first to third embodiments can be applied to evaluation on an optical characteristic of an optical system. That is, by using a wavefront aberration measuring method of the disclosure after an optical system is assembled, it can be checked whether or not the assembled optical system has a predetermined optical characteristic. As described above, if the wavefront aberration measuring method of the disclosure serves as a step included in a manufacturing method of an optical system, it can be determined whether the optical system is a defective product or a non-defective product in view of the optical characteristic of the optical system.

Also, the disclosure may be provided by executing the following processing. This is processing of supplying software (program) that provides the function of the above-described embodiment to a system or a device through a network or any of various types of recording media, and reading and executing the program with use of a computer of the system or the device.

Also, in any of the above-described embodiments, the position of the light source is arranged at a side opposite to the light receiving element with respect to the test optical system, and is at a limited distance from the test optical system. However, the arrangement is not limited thereto. For example, if parallel light rays are incident on the test optical system, the light source may be arranged at a position separated from the test optical system by an infinite distance.

Further, in any of the above-described embodiments, the test optical system has a positive power. However, the disclosure may be similarly applied even to a test optical system having a negative power. If a test optical system has a negative power, convergent light is required for an incident wavefront.

The light source is arranged close to the light receiving element with respect to the test optical system.

TABLE 1

| Term No. | Expansion |
|---|---|
| 1 | 1 |
| 2 | $r\cos\theta$ |
| 3 | $r\sin\theta$ |
| 4 | $2r^2 - 1$ |
| 5 | $r^2\cos 2\theta$ |
| 6 | $r^2\sin 2\theta$ |
| 7 | $(3r^3 - 2r)\cos\theta$ |
| 8 | $(3r^3 - 3r)\sin\theta$ |
| 9 | $6r^4 - 6r^2 + 1$ |
| 10 | $r^3\cos 3\theta$ |
| 11 | $r^3\sin 3\theta$ |
| 12 | $(4r^4 - 3r^2)\cos 2\theta$ |
| 13 | $(4r^4 - 3r^2)\sin 2\theta$ |
| 14 | $(10r^5 - 12r^3 + 3r)\cos\theta$ |
| 15 | $(10r^5 - 12r^3 + 3r)\sin\theta$ |
| 16 | $20r^6 - 30r^4 + 12r^2 - 1$ |

Aspects of the present disclosure can also be realized by a computer of a system or apparatus (or devices such as a CPU, a micro processing unit (MPU), or the like) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., a non-transitory computer-readable medium).

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2012-253308 filed Nov. 19, 2012, which is hereby incorporated by reference herein in its entirety.

What is claimed is:

1. A wavefront aberration measuring method comprising:
a measuring step of forming a plurality of spot images by causing light, which is emitted from a light source and is transmitted through a test optical system, to be incident on a lenslet array, and measuring positions of the plurality of spot images formed by the lenslet array; and
a calculating step of calculating optical paths from the positions of the plurality of spot images toward the light source based on backward ray tracing, changing parameters of the test optical system so as to specify parameters when light rays from the positions of the plurality of spot images converge at the light source, and calculating a wavefront aberration of the test optical system corresponding to the parameters of the test optical system.

2. The wavefront aberration measuring method according to claim 1, wherein the parameters of the test optical system are a shape error and an arrangement error of the test optical system.

3. The wavefront aberration measuring method according to claim 1, wherein, in the calculating step, the shape error of the test optical system is determined by using Zernike coefficients.

4. The wavefront aberration measuring method according to claim 1, wherein correspondences between a plurality of lenslets forming the lenslet array and the plurality of spot images are determined, by determining a lenslet through which a light ray is transmitted, the light ray which passes through a position being closest to the light source, among a plurality of light rays, which are emitted from a specific spot image, respectively transmitted through the plurality of lenslets forming the lenslet array, and directed toward the light source.

5. The wavefront aberration measuring method according to claim 1, wherein the optical paths are calculated in the calculating step by replacing a specific spot image with a plurality of spot images.

6. A method of manufacturing an optical system, the method comprising a step of evaluating an optical characteristic of an optical system by using the wavefront aberration measuring method according to claim 1.

7. A wavefront aberration measuring device, comprising:
a light source configured to emit light which is incident on a test optical system;
a lenslet array on which the light transmitted through the test optical system is incident;
a light receiving element configured to receive the light transmitted through the lenslet array; and
a calculating unit configured to calculate optical paths from positions of a plurality of spot images formed on the light receiving element by the lenslet array toward the light source based on backward ray tracing, change parameters of the test optical system so as to specify parameters when light rays from the positions of the plurality of spot images converge at the light source, and calculate a wavefront aberration of the test optical system corresponding to the parameters of the test optical system.

8. A non-transitory recording medium storing a program for causing a wavefront aberration measuring device to execute a method, the method comprising:
a measuring step of forming a plurality of spot images by causing light, which is emitted from a light source and is transmitted through a test optical system, to be incident on a lenslet array, and measuring positions of the plurality of spot images formed by the lenslet array; and
a calculating step of calculating optical paths from the positions of the plurality of spot images toward the light source based on backward ray tracing, changing parameters of the test optical system so as to specify parameters when light rays from the positions of the plurality of spot images converge at the light source, and calculating a wavefront aberration of the test optical system corresponding to the parameters of the test optical system.

* * * * *